United States Patent [19]
Andersen

[11] Patent Number: 6,116,771
[45] Date of Patent: Sep. 12, 2000

[54] MULTI-SHAFT EXTRUDER SCREW BUSHING AND EXTRUDER

[75] Inventor: Paul G. Andersen, Warwick, N.Y.

[73] Assignee: Krupp Werner & Pfleiderer Corporation, Ramsey, N.J.

[21] Appl. No.: 09/245,242

[22] Filed: Feb. 5, 1999

[51] Int. Cl.[7] .............................. B21C 1/06; B29B 7/14; B29B 7/20
[52] U.S. Cl. ................................. 366/85; 366/79
[58] Field of Search ................. 366/85, 79, 83, 366/84, 318, 301, 300, 310

[56] References Cited

U.S. PATENT DOCUMENTS

| | | | |
|---|---|---|---|
| 1,356,296 | 10/1920 | Casse | 366/76.4 |
| 2,434,707 | 1/1948 | Marshall | 366/85 |
| 2,441,222 | 5/1948 | Fuller | 366/84 |
| 3,254,367 | 6/1966 | Erdmenger | 366/85 |
| 5,372,418 | 12/1994 | Biesenberger et al. | 366/85 |
| 5,487,602 | 1/1996 | Valsamis et al. | 366/85 |
| 5,573,332 | 11/1996 | Weihrich et al. | 366/85 |

*Primary Examiner*—Tony G. Soohoo
*Attorney, Agent, or Firm*—Robert F. I. Conte; Lee, Mann, Smith, McWilliams, Sweeney & Ohlson

[57] ABSTRACT

A single flighted multi-screw conveying bushing that has only one helical screw element extending the length of the bushing. The bushing has a cross-section shape that has a segmented circular base and a lobe extending from the base. The lobe has a truncated crest that is sized to have a circumferential angle of from 15° to 30° and preferably from 22° to 24°. Also, a twin screw extruder having a pair of side by side drive shafts with at least two of the single flighted screw bushings mounted end to end on each shaft.

13 Claims, 5 Drawing Sheets

6,116,771

MULTI-SHAFT EXTRUDER SCREW BUSHING AND EXTRUDER

BACKGROUND OF THE INVENTION

1. Field of the Invention

The present invention relates to multi-shaft extruder screw bushings for conveying/mixing material in a multi-shaft extruder. More particularly, the present invention relates to a single flighted conveying/mixing screw bushings having only a single helically extending screw element.

2. Background Art

Screw conveying bushings for twin-screw extruders are well known. Generally, the screw bushings are generally 2 or 3-flighted bushings have 2 to 3 screw elements helically extending the length of the bushing. The crest of the screw elements are generally flat. These prior art screw bushings are manufactured such that side by side screw element crests generally mesh with each other when mounted in a twin screw extruder. The end walls of a standard screw bushing have flat surfaces. The end wall flat surface has a central annular section with two lobes extending diametrically opposite each other from the central section.

Each of the lobes has a truncated crest. Generally, two or more of the screw bushings are placed end to end to provide a continuous helical screw on each side by side twin screw extruder drive shaft. These screw bushings are generally used for conveying materials in the extruder.

A single flighted screw bushing is known for use to build up pressure generally at the end of the extruder. However, this type of screw bushing has a large arcuate crest that permits flow of product from one bushing to its side by side bushing as the above described 2 and 3-flighted screw bushings do. Thus, this known single flighted bushing is generally not used for the conveying/mixing of material.

SUMMARY OF THE INVENTION

It is an aspect of the invention to provide a single flighted extruder screw bushing that both conveys and somewhat mixes the material being conveyed in a twin or multi-screw extruder. This is hereinafter referred to as a single flighted screw conveying/mixing bushing. My twin screw conveying/mixing bushings have only one helical screw element extending the length of the bushings. The screw elements have an outer diameter and an inner diameter with the bushing having a bore to attach the bushing to a drive shaft. One end wall of the bushing has a cross-section shape that has a central annular section and only one lobe radially extending from the annular section. The lobe has a truncated crest that extends for an angle of from 15°–30° and preferably 22° to 24°.

Generally, two or more of my screw bushings are placed end to end on each side by side extruder drive shaft. When they are placed in a 0° orientation, all apex area interaction is eliminated and they provide a channel split for the material to divide and promote better mixing. When they are placed in a 90° orientation, there is minimal apex area interaction and a path for better cross-channel material flow is opened.

My screw bushings preferably have a ratio of the outer diameter to the inner diameter of from about 1.4 to about 1.7 and preferably 1.55, the screw element with a pitch of about 0.5 to 2 times the outer diameter, and the outer diameter being 25 to 380 mm.

The materials that can be conveyed and mixed by my screw bushings are generally various types of polymers, starches and viscous substances.

The screw bushings are described as being applicable for a twin-screw extruder. However, the screw bushings may be used with an extruder having more than two side by side screws or shafts (multi-screw or multi-shaft extruder).

My screw bushings are constructed such that when they are mounted on the shafts of the multi-shaft extruder, they are non-rotatable relative to their respective shaft. This is done by splines or key joints on the bushing and the corresponding shaft.

Another aspect of the invention is to provide a twin screw extruder having a pair of side by side drive shafts with at least two screw bushings on each shaft. The at least two screw bushings on each shaft are identical single-flighted bushings having only one helical screw element extending the length of the bushings. The screw element has an outer diameter and an inner diameter with a central annular section defining a bore to attach the bushing to a drive shaft. The bushing has an end flat surface shape having an annular section and a lobe extending from the annular surface and the lobe has a truncated crest that extends for a circumferential angle of from 15°–30° and preferably from 22° to 24°.

Further aspects and advantages of the invention will become apparent from the following embodiment taken in conjunction with the drawings.

DETAILED DESCRIPTION OF THE DRAWINGS AND THE PREFERRED EMBODIMENT

FIG. 1 illustrates a pair of prior art twin screw extruder screw bushing 11 for conveying material in a twin screw extruder. The bushings are shown in a side-by-side relationship as if they were mounted on twin screw extruder shafts. The screw bushings 11 are identical to each other. The screw bushings 11 are two flighted elements. That is, they have two helical screw elements 12 and 13. The helical screw elements 12 and 13 have flat helical crests 14 and 16 respectively.

The bushings 11 have a central passageway or bore so as to be mounted on the drive shafts of an extruder. The bore has an appropriate mount to attach the bushing to the extruder drive shafts so that they do not rotate relative to their respective shafts.

Figure 1A:
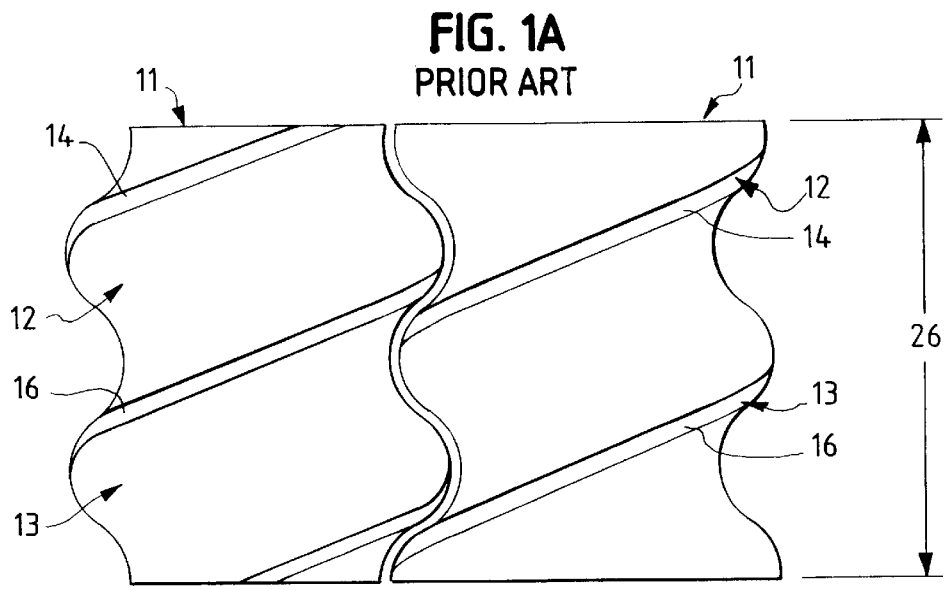
FIG. 1A is a perspective view of a pair of prior art twin screw bushings.
Figure 1B:
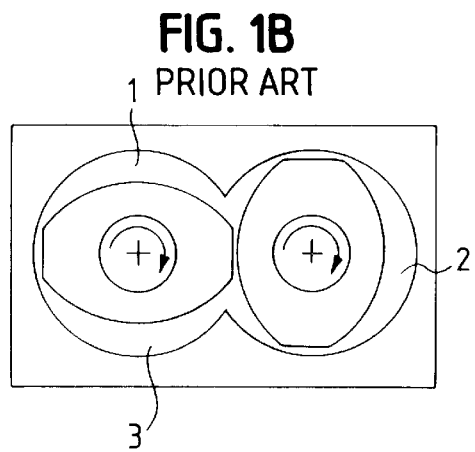
FIGS. 1B and 1C diagrammatically illustrate the working principles of the bushings of FIG. 1A.
Figure 1C:
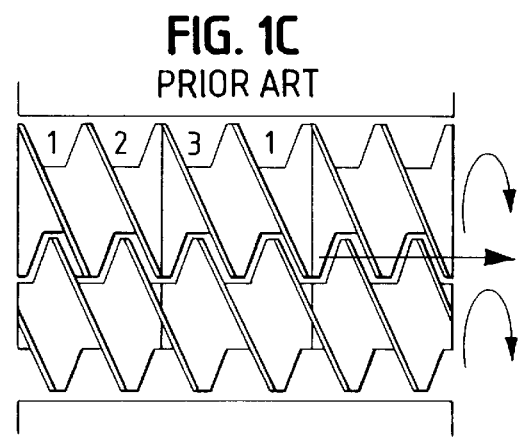

FIGS. 1B and 1C diagrammatically illustrate the working principle of the conveying elements of the bushings 11 when mounted at a 90° orientation and both rotated in the same direction.

Figure 2A:
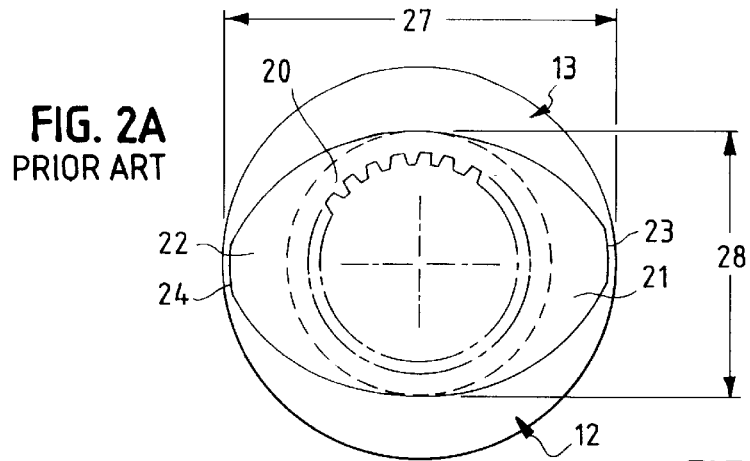
FIG. 2A is a planar view of the right side of one of the bushings of FIG. 1.
Figure 2B:
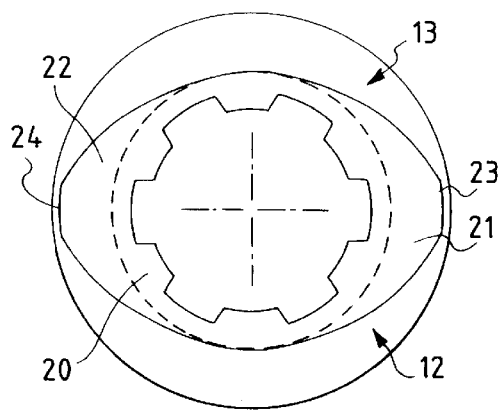
FIG. 2B is a right side planar view of another prior art twin screw bushing.
Figure 2C:
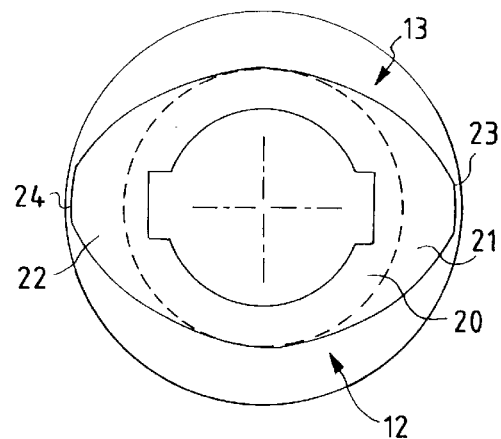
FIG. 2C is a right side planar view of still another prior art twin screw bushing.
Figure 4:
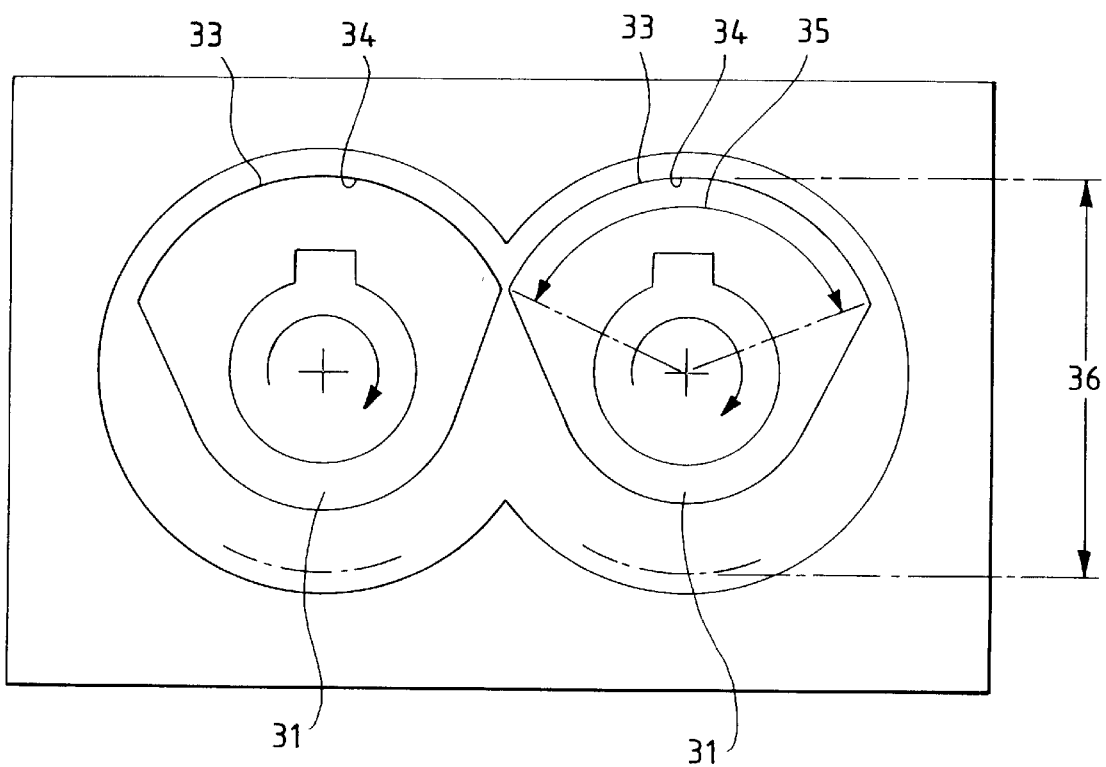
FIG. 4 is an end diagrammatic view of the working screw bushings of FIG. 3.

FIGS. 2A–2C are only for illustrative purposes of some of the mounts used with the screw bushings of the prior art and which mounts can be used with my screw bushings which are described infra. FIG. 2A illustrates using 24 involute spline teeth, FIG. 2B illustrates using six straight sided splines, FIG. 2C illustrates using two keys and FIG. 4 illustrates using a single key.

These are only some of the known drive shaft attachments and others may also be readily used. The use of the multiple splines as shown in FIG. 2A provide the most flexibility of orientating two or more screw bushings 11 on appropriate extruder drive shafts relative to one another in both their end to end and side by side orientation.

As shown by FIGS. 2A–2C, the screw bushing 11 has an annual center section 20 defining the bore. A pair of diametrically opposite lobes 21 and 22 extend from the annular center section. Each lobe has a flat crest 23 and 24 respectively. The flat crest 23 is diametrically opposite the flat crest 24. The screw element 12 is part of the crest 23 and the screw element 13 is part of the crest 24.

Two or more screw bushings 11 are mounted end to end on a first extruder shaft to provide continuous helical screw elements. Two or more screw bushings 11 are mounted end to end on a second extruder shaft to provide continuous helical screw elements. The first and second shafts are in side by side relationship and the bushings on the second shaft are mounted in a 90° orientation to the bushings on the first shaft to have the configuration as shown in FIG. 1.

The screw bushing 11 has an axial length 26 (FIG. 1A), an outer or major diameter 27, an inner or minor diameter 28. The length 26 of bushing 11 is equal to the pitch of each screw element. That is, the screw elements 12 and 13 rotate over the length 26 at an angle of about 360°. However, it is not a requirement that the pitch and length be equal. As shown in FIG. 1A, the screw element 12 of the right bushing 11 wipes and intermeshes with the screw element 13 of the left bushing.

Figure 3:
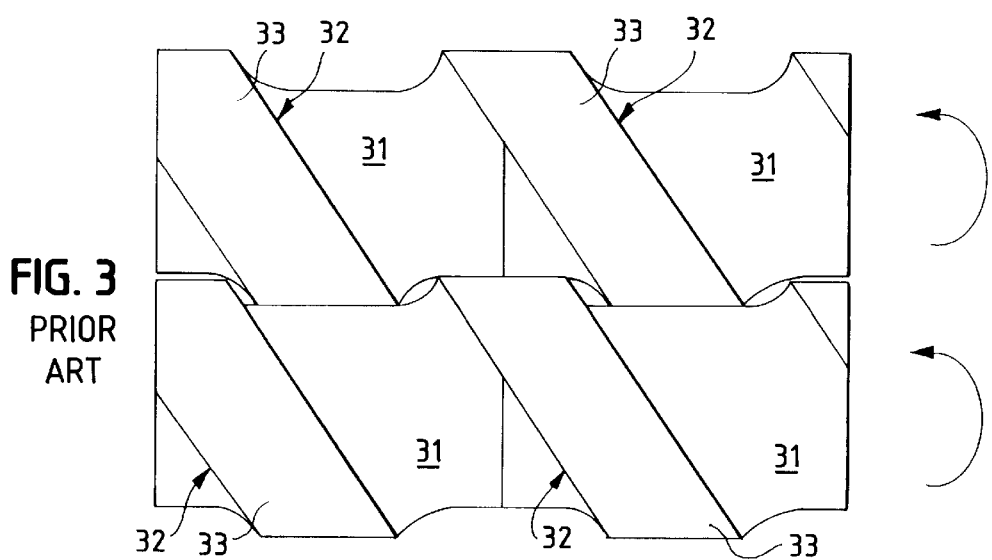
FIG. 3 is a top view of prior art single flighted screw bushing.

FIG. 3 shows four identical single flighted screw bushings 31 each having a screw element 32 helically extending t he length of their respective bushing.

The screw elements 32 each have an arcuate crest 33. As shown in FIG. 4, the arcuate crest extends for an arc 34 when measured along the circumference of the bushing's outer diameter 36 or an angle of more than 100°. The upper two single flighted screw bushings as shown in FIG. 3 are at 0° orientation to the lower two single flighted screw bushings. This is, the crests 33 of each side by side screw bushing faces in the same direction as is shown in FIG. 4. The single flighted screw bushings of FIGS. 3 and 4 are generally used at the end of an extruder to build up pressure to extrude the product. The single flighted screw bushings with their large arcuate crests only allows axial movement of the product and does not allow radial movement of the product to the adjacent bushing.

Therefore, these screw bushings are not generally used for conveying material in multi-shaft extruder and would not be used in place of the 2-flighted screw bushings of FIG. 1A.

Figure 5:
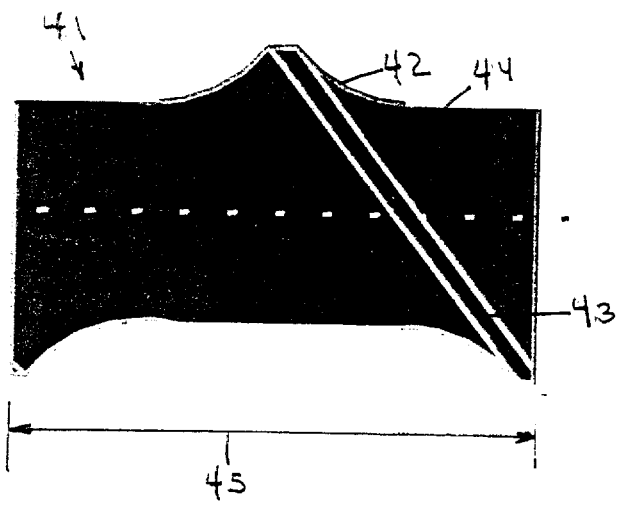
FIG. 5 is a top perspective view of a multi-shaft extruder screw bushing of the present invention.
Figure 6:
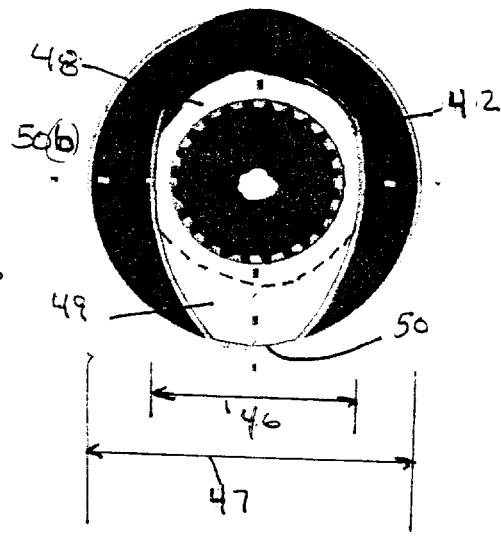
FIG. 6 is a planar view of the right side of FIG. 5.

FIGS. 5 and 6 illustrate my improved multi-shaft extruder single flighted screw conveying/mixing bushings 41. This is used for conveying and some mixing of the material in a twin or multi-screw extruder. The material as noted above is generally polymers, starches and any viscous substance.

The single flighted screw bushing 41 has only one helical screw element 42 versus the two or more screw elements of the prior art. The screw element 42 has a flat helical crest 43. Screw bushing 41 has an annular base surface 44, a length 45, inner or minor diameter 46, and an outer or major diameter 47. The bushings 41 have twenty four (24) inner splines for being joined to an appropriate extruder drive shaft having corresponding splines. The bushing 41, of course, can have any of the mounting configurations shown in FIGS. 2A–2C, 4 or which are commonly used for this purpose. Screw bushing 41 as shown in FIG. 6 has an annular center section 48 defining the bore with a center. A single lobe 49 radially extends from the center section. The lobe 49 has a flat crest 50 that extends for an angle 50a. The angle 50a is from the center 50b to each edge of the crest 50. The angle 50a is from 15° to 30° and preferably from 22° to 24°.

The bushing 41 shown in FIGS. 5 and 6 has a pitch equal to the length 45 and over the length, the screw element 42 rotates at an angle of 360°.

In a twin shaft extruder, more than two screw bushings 41 are mounted end to end on the first extruder shaft to provide a continuous helical screw element and the same number of screw bushings 41 are mounted end to end on the second extruder shaft to provide a continuous helical screw element.

The first and second extruder shafts are in side by side relationship so that the side by side bushings will convey and mix the material in the extruder.

Figure 7:
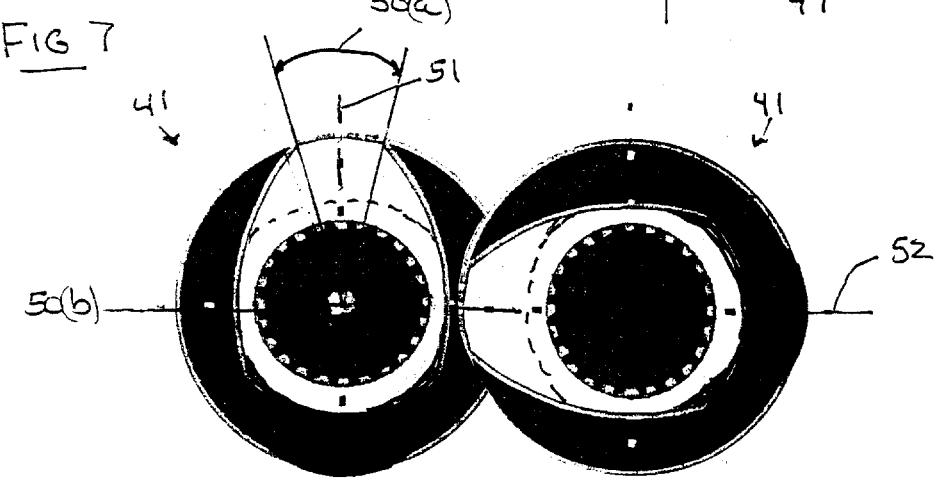
FIG. 7 is an end planar top perspective view of a side by side pair of the screw bushings of FIG. 6 in 90° orientation.

FIG. 7 shows an end view of a pair of screw bushings 41 mounted on the extruder side by side shafts such that the screw bushings are in 90° orientation. That is, the right screw element lobe crest 50 faces the left screw bushing 41 such that the left crest center line 51 intersects to the right crest center line 52 at an angle of 90°.

Figure 8:
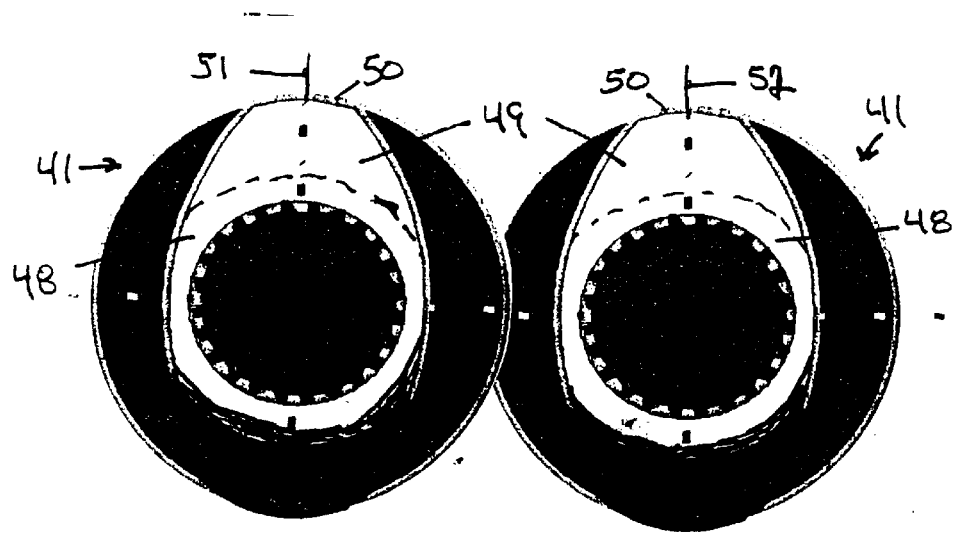
FIG. 8 is an end planar view of a side by side pair of the screw bushings of FIG. 6 in 0° orientation.

FIG. 8 shows another orientation for the side by side screw bushings 41 mounted on side by side twin extruder shafts. This embodiment shows a 0° orientation which is my preferred orientation. That is, the lobes 49 and have their respective crests 50 facing in the same direction with their center lines 51 and 52 being parallel.

The bushing 41 is such that it provides a new low energy conveying/mixing geometry. With the pair of screw bushings 41 mounted on the extruder shafts as shown in FIG. 7, there is minimal interaction and it opens up a path for better cross-channel material flow.

When the bushings 41 are mounted on the extruder shafts as shown in FIG. 8, with a 0° orientation, all apex interaction is eliminated and there is a channel split for the material in the extruder to divide and promote better mixing.

The bushings 41 preferably have an outer diameter of from about 25 mm to about 380 mm, a ratio of the outer diameter to the inner diameter for the 90° orientation shown in FIG. 7 of about 1.4 to about 1.7 and preferably about 1.55. The pitch of the screw element is preferably between 0.5 to 2 times the outer diameter.

Figure 9:
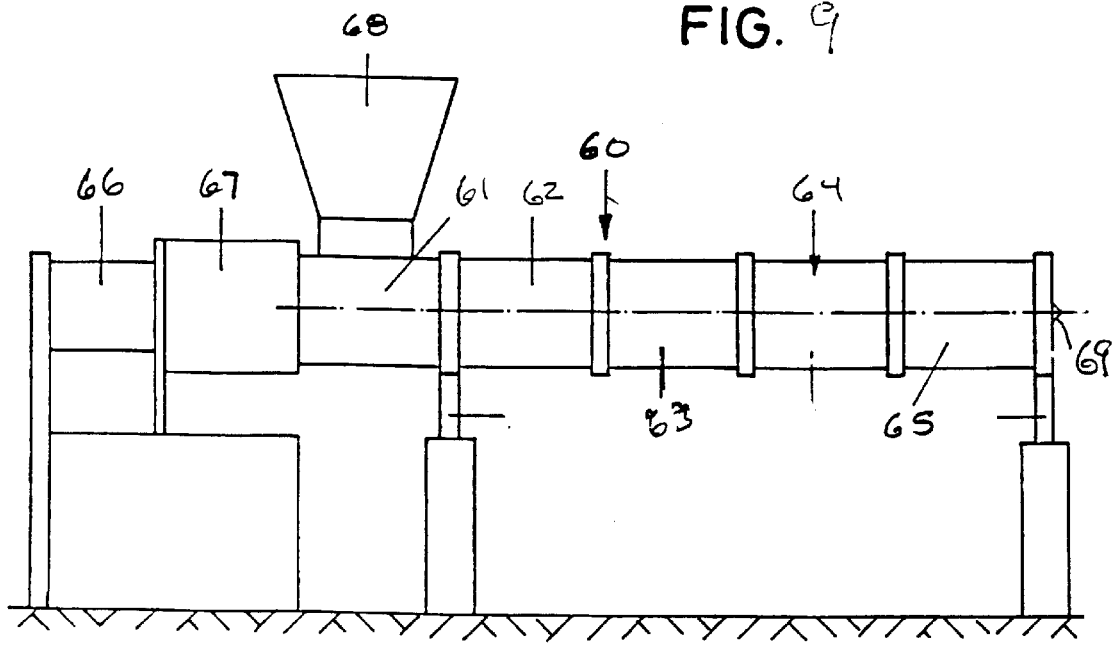
FIG. 9 is a diagrammatic view of a multi-screw type extruder.
Figure 1A:
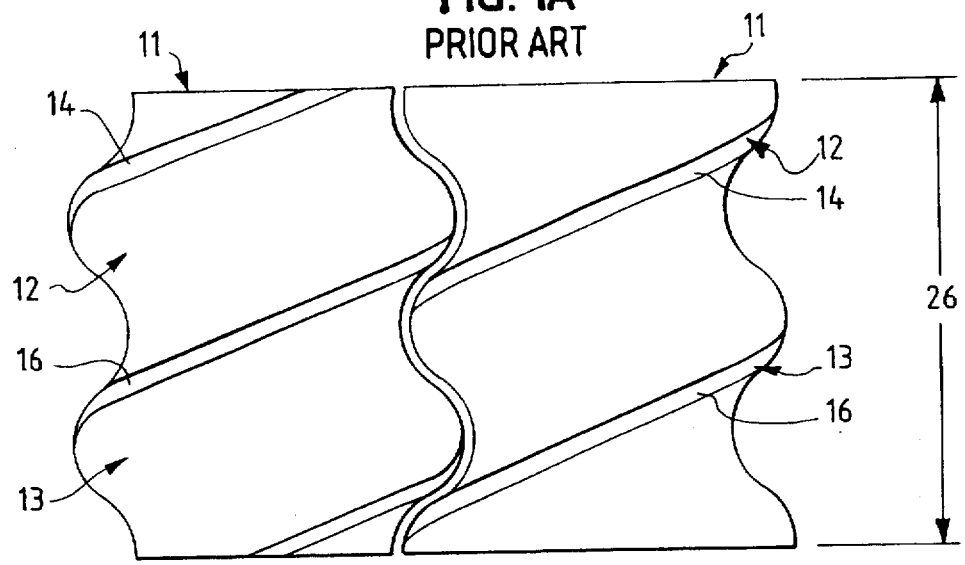
Figure 1B:
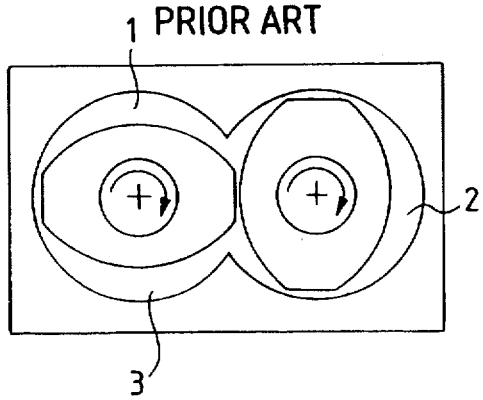
Figure 1C:
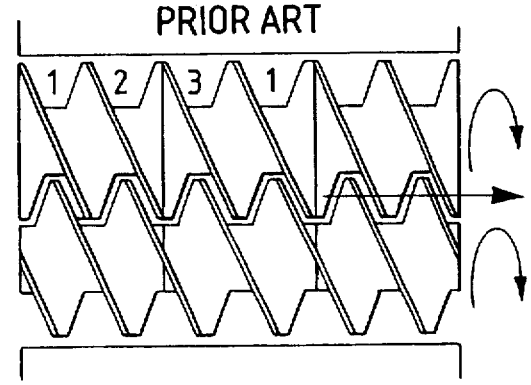
Figure 2A:
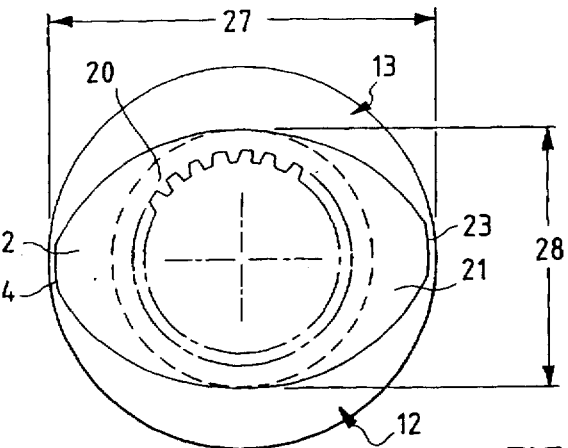
Figure 2B:
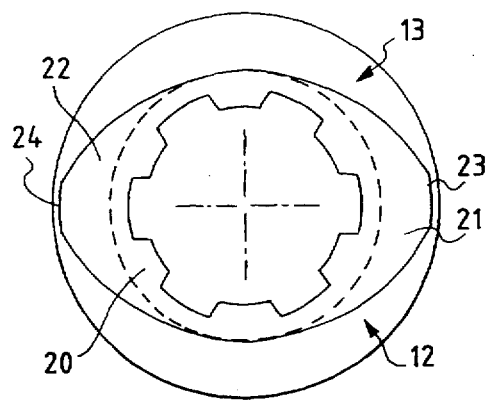
Figure 2C:
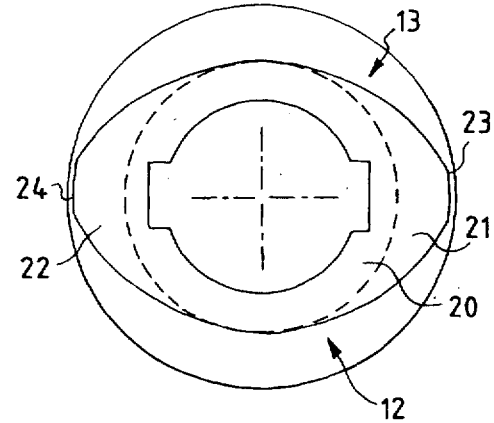
Figure 3:
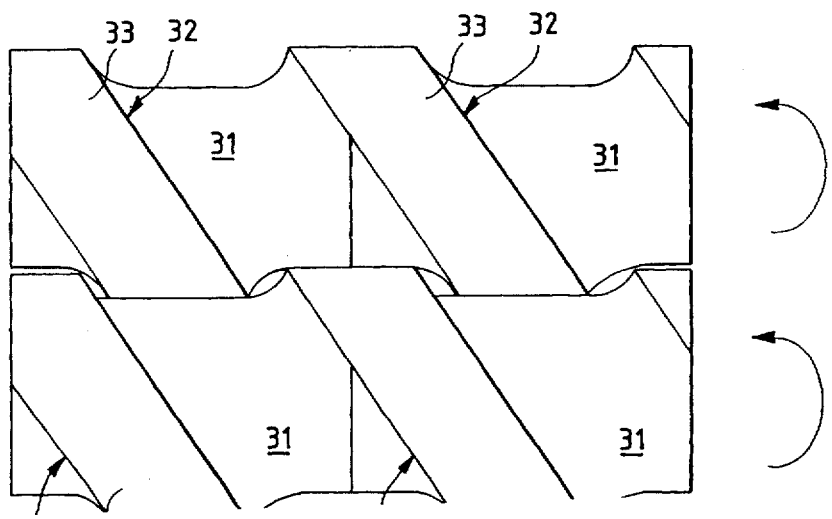
Figure 4:
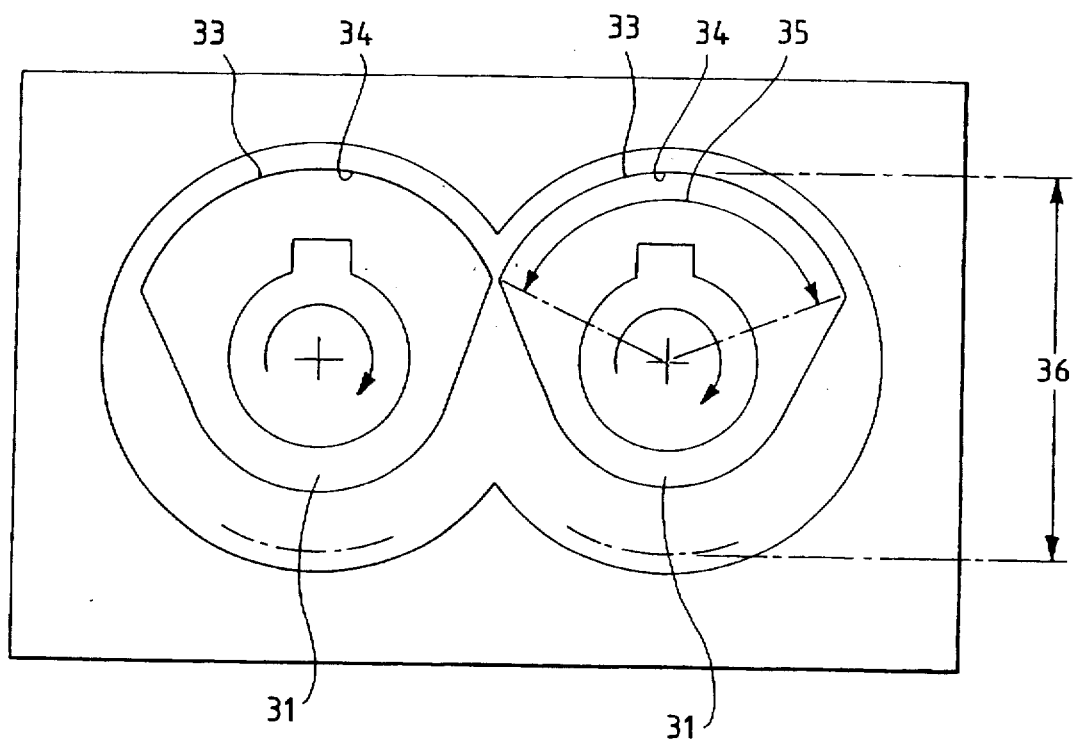
Figure 8:
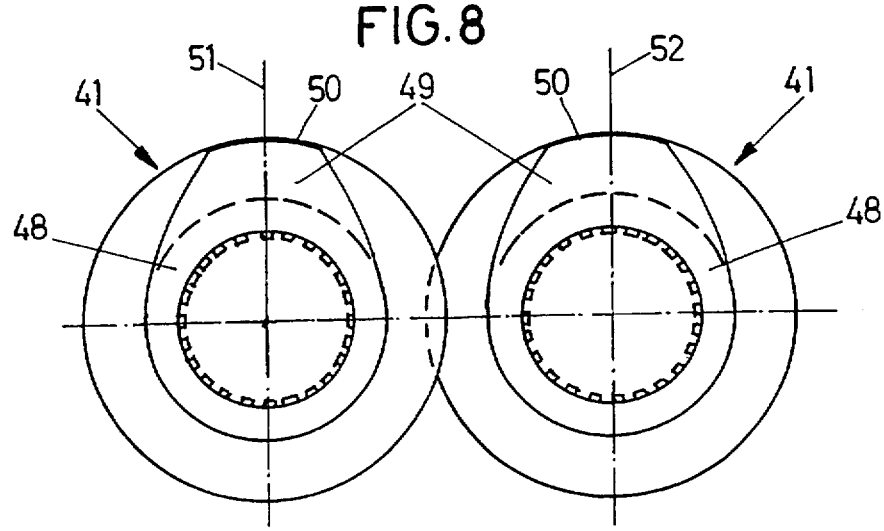
Figure 9:
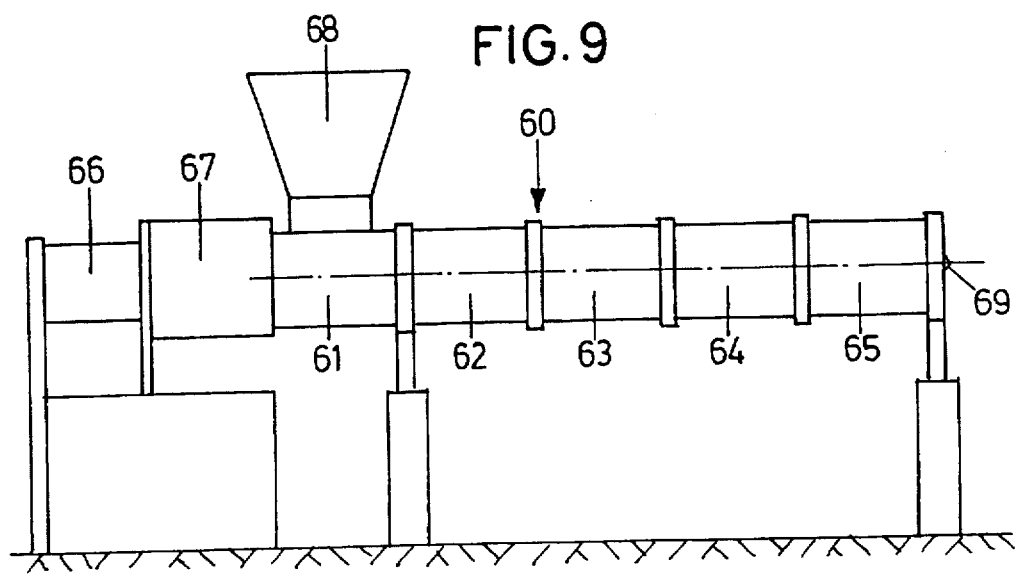

A screw-type extruding machine is diagrammatically shown in FIG. 9. This screw-type extruding machine has a housing 60 having a plurality of sections 61, 62, 63, 64, 65, which are disposed axially one behind the other and flanged to one another. Two shafts are located in the housing which are driven via a gearbox 67 by a motor 66. A hopper 68 discharges material to be processed into the first housing section 65.

Sections 61 and 62 contain three or more of the bushings 41 on each of the shafts and they are oriented as shown in FIGS. 7 and/or 8. Section 63 contains kneading discs, and sections 64 and 65 contain the bushings 41 as shown in FIGS. 7 and/or 8.

The invention is not restricted to the above-described embodiments, but modifications and variations may be made without departing from the spirit and scope of the invention as defined by the appended claims.

I claim:

1. A multi-shaft screw conveying bushing comprising only one helical screw element extending the length of said bushing, said screw element having an outer diameter and an inner diameter, a ratio of said outer diameter to said inner diameter is from about 1.4 to about 1.7, said bushing having a bore to attach said bushing to a drive shaft, said bushing has a cross-section shape having a segmented circular base, a lobe extending from said base, said lobe having a truncated crest, and said crest has an angle of from 15° to 30°.

2. The bushing of claim 1 wherein the screw element has a pitch of about 0.5 to 2 times said outer diameter.

3. The bushing of claim 2 wherein the outer diameter is from 25 mm to 380 mm.

4. The bushing of claim 2 wherein said angle is from 15° to 24°.

5. In a twin screw extruder having a pair of side by side drive shafts with at least two screw bushings mounted end to end on each shaft comprising said at least two screw bushings on each shaft are identical bushings, said identical bushing having only one helical screw element extending the length of each of said bushings, said screw element having an outer diameter and an inner diameter, a ratio of said outer diameter to said inner diameter is from about 1.4 to about 1.7, said bushings each having a bore to attach said bushings to said drive shafts, and each of said bushing has a cross-section shape having an annular section and a lobe extending from said annular section, said lobe having a truncated crest, and said crest has an angle of from 15° to 30°.

6. The extruder of claim 5 wherein the screw element on each bushing has a pitch of about 0.5 to 2 times said outer diameter.

7. The extruder of claim 6 wherein the outer diameter is from 25 to 380 mm.

8. The extruder of claim 7 wherein said extruder has at least two of said bushings mounted end to end on a first drive shaft and at least two of said bushings mounted end to end on a second drive shaft wherein said bushings on said second drive shaft are oriented 0° to said bushings on said first drive shaft.

9. The extruder of claim 8 wherein said angle is from 15° to 24°.

10. The extruder of claim 6 wherein said extruder has at least two of said bushings mounted end to end on a first drive shaft and at least two of said bushings mounted end to end on a second drive shaft wherein said bushings on said second drive shaft are oriented 90° to said bushings on said first drive shaft.

11. The extruder of claim 10 wherein said angle is from 15° to 24°.

12. The extruder of claim 6 wherein said extruder has at least two of said bushings mounted end to end on a first drive shaft and at least two of said bushings mounted end to end on a second drive shaft wherein said bushings on said second drive shaft are oriented 0° to said bushings on said first drive shaft.

13. The extruder of claim 12 wherein said angle is from 15° to 24°.

* * * * *

UNITED STATES PATENT AND TRADEMARK OFFICE
CERTIFICATE OF CORRECTION

PATENT NO. : 6,116,771
DATED : September 12, 2000
INVENTOR(S) : Paul G. Andersen It is certified that error appears in the above-identified patent and that said Letters Patent is hereby corrected as shown below:

The title page, should be deleted, to appear as per attached title page.

The sheets of drawings, consisting of figures 1-9, should be deleted to appear as per attached sheets.

Signed and Sealed this

Twenty-seventh Day of November, 2001

Attest:

NICHOLAS P. GODICI
Attesting Officer     Acting Director of the United States Patent and Trademark Office

United States Patent [19]
Andersen

[11] Patent Number: 6,116,771
[45] Date of Patent: Sep. 12, 2000

[54] MULTI-SHAFT EXTRUDER SCREW BUSHING AND EXTRUDER

[75] Inventor: Paul G. Andersen, Warwick, N.Y.

[73] Assignee: Krupp Werner & Pfleiderer Corporation, Ramsey, N.J.

[21] Appl. No.: 09/245,242

[22] Filed: Feb. 5, 1999

[51] Int. Cl.$^7$ .............. B21C 1/06; B29B 7/14; B29B 7/20

[52] U.S. Cl. .............. 366/85; 366/79

[58] Field of Search .............. 366/85, 79, 83, 366/84, 318, 301, 300, 310

[56] References Cited

U.S. PATENT DOCUMENTS

| | | | |
|---|---|---|---|
| 1,356,296 | 10/1920 | Casse | 366/76.4 |
| 2,434,707 | 1/1948 | Marshall | 366/85 |
| 2,441,222 | 5/1948 | Fuller | 366/84 |
| 3,254,367 | 6/1966 | Erdmenger | 366/85 |
| 5,372,418 | 12/1994 | Biesenberger et al. | 366/85 |
| 5,487,602 | 1/1996 | Valsamis et al. | 366/85 |
| 5,573,332 | 11/1996 | Weihrich et al. | 366/85 |

Primary Examiner—Tony G. Soohoo
Attorney, Agent, or Firm—Robert F. I. Conte; Lee, Mann, Smith, McWilliams, Sweeney & Ohlson

[57] ABSTRACT

A single flighted multi-screw conveying bushing that has only one helical screw element extending the length of the bushing. The bushing has a cross-section shape that has a segmented circular base and a lobe extending from the base. The lobe has a truncated crest that is sized to have a circumferential angle of from 15° to 30° and preferably from 22° to 24°. Also, a twin screw extruder having a pair of side by side drive shafts with at least two of the single flighted screw bushings mounted end to end on each shaft.

13 Claims, 5 Drawing Sheets

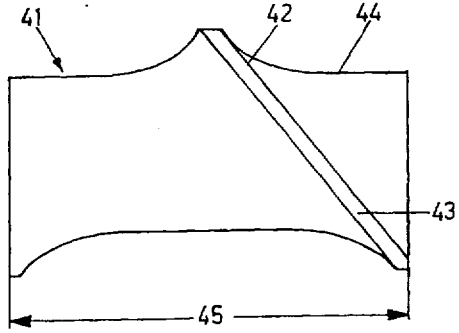

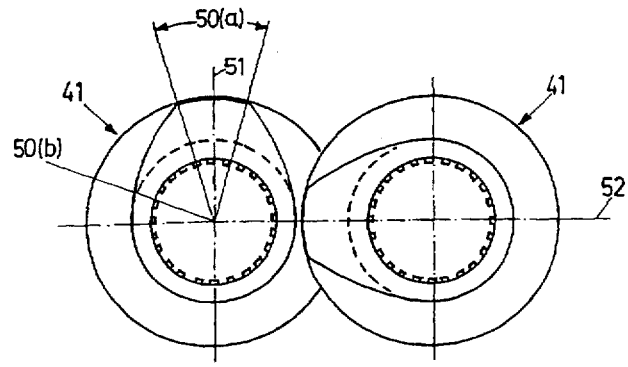

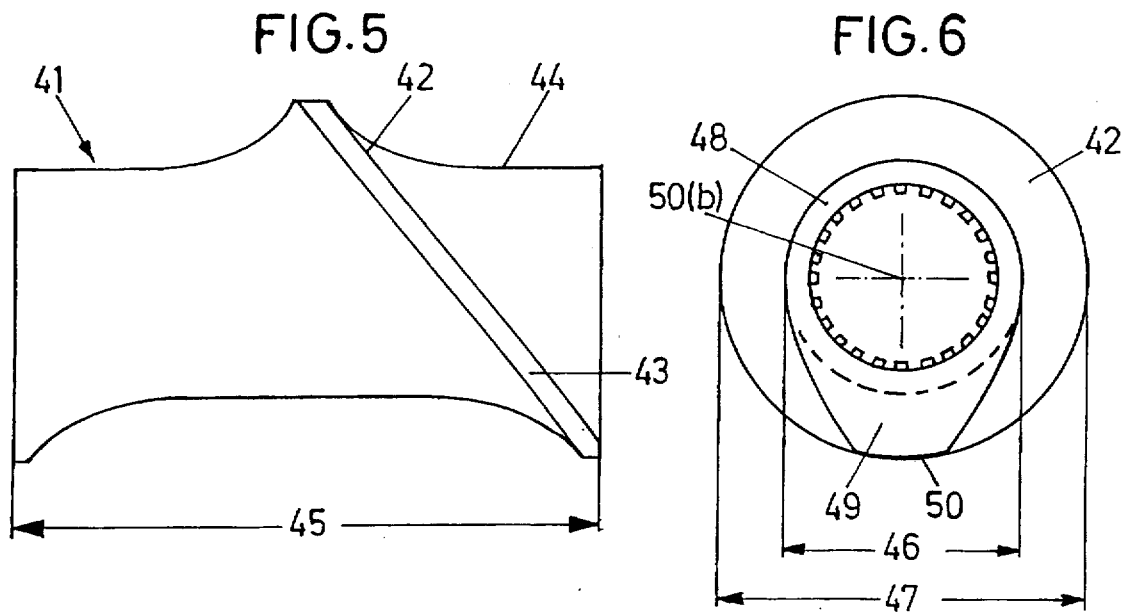
FIG. 5
FIG. 6
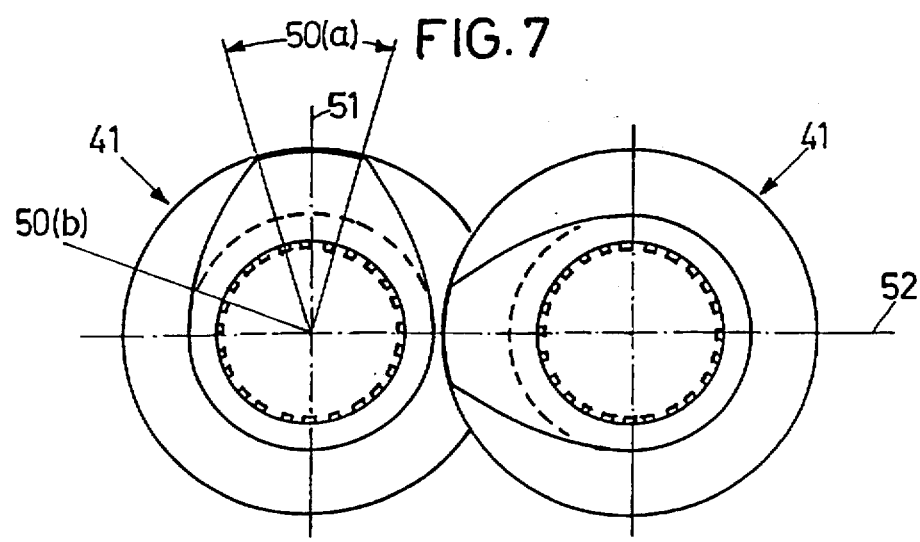
FIG. 7